United States Patent [19]

Miyake et al.

[11] Patent Number: 4,604,170

[45] Date of Patent: Aug. 5, 1986

[54] MULTI-LAYERED DIAPHRAGM FOR ELECTROLYSIS

[75] Inventors: Haruhisa Miyake; Manabu Suhara; Yoshio Sugaya; Hirofumi Horie, all of Yokohama, Japan

[73] Assignee: Asahi Glass Company Ltd., Tokyo, Japan

[21] Appl. No.: 802,054

[22] Filed: Nov. 25, 1985

[30] Foreign Application Priority Data

Nov. 30, 1984 [JP] Japan ................. 59-251736

[51] Int. Cl.$^4$ .................. C25B 1/34; C25B 1/46; C25B 13/02
[52] U.S. Cl. ...................... 204/98; 204/128; 204/252; 204/282; 204/296
[58] Field of Search ............ 204/98, 128, 252, 282, 204/296

[56] References Cited

U.S. PATENT DOCUMENTS

| | | | |
|---|---|---|---|
| 3,976,549 | 8/1976 | Falvo | 204/296 |
| 4,124,458 | 11/1978 | Moeglich | 204/296 |
| 4,135,996 | 1/1979 | Bouy et al. | 204/98 |
| 4,289,600 | 9/1981 | Lasarz et al. | 204/296 |
| 4,289,601 | 9/1981 | Kadija | 204/296 |
| 4,341,615 | 7/1982 | Bachot et al. | 204/296 |
| 4,342,636 | 8/1982 | Chang et al. | 204/296 |
| 4,399,009 | 8/1983 | Chisholm | 204/296 |
| 4,455,210 | 6/1984 | Coker et al. | 204/296 |
| 4,457,815 | 7/1984 | Levin | 204/296 |

*Primary Examiner*—John F. Niebling
*Assistant Examiner*—Terryence Chapman
*Attorney, Agent, or Firm*—Oblon, Fisher, Spivak, McClelland & Maier

[57] ABSTRACT

A multi-layered diaphragm for electrolysis, which comprises a porous layer of a fluorine-containing polymer having a pore diameter of from 0.05 to 10 $\mu$m, a porosity of from 30 to 95% and a thickness of from 30 to 450 $\mu$m and with its interior and anode-side surface being hydrophilic, and an ion exchange resin layer supported on the cathode side thereof and having a thickness thinner than the porous layer but of at least 5 $\mu$m and an ion exchange capacity of from 0.5 to 2.0 meq/g dry resin, the total thickness being from 35 to 500 $\mu$m.

9 Claims, No Drawings

MULTI-LAYERED DIAPHRAGM FOR ELECTROLYSIS

The present invention relates to a novel multi-layered diaphragm for electrolysis. More particularly, the present invention relates to a novel multi-layered diaphragm useful for the electrolysis of e.g. an aqueous alkali metal chloride solution, which has high current efficiency and low membrane resistance, and particularly high mechanical strength.

For the production of an alkali metal hydroxide and chlorine by the electrolysis of an aqueous alkali metal chloride solution, it has been common in recent years to use an ion exchange membrane method. The ion exchange membrane used in such an ion exchange membrane method is required to have high mechanical strength as well as high current efficiency and low membrane resistance.

For this purpose, there has been proposed a multi-layered ion exchange membrane obtained by laminating an ion exchange resin film having high electric resistance and low water content, and an ion exchange resin film having low electric resistance and high water content into a unitary structure (Japanese Unexamined Patent Publications No. 36589/1977 and No. 132089/1978), whereby a substantial improvement in the properties has been achieved.

However, in order to reduce the membrane resistance and further save the energy by such a multi-layered ion exchange membrane, it is required to further increase the water content. Such an increase of the water content brings about an abrupt deterioration of the membrane strength, and thus has a limitation.

On the other hand, a diaphragm obtained by unifying a thick layer of a porous material and a thin layer of a substantially water-impermeable cation exchange resin, is known by Japanese Unexamined Patent Publications No. 82681/1977 and No. 11199/1978. Such a diaphragm is primarily intended for the improvement of current efficiency in the production of a highly concentrated alkali metal hydroxide, and total thickness of the diaphragm is preferably as thick as from 0.6 to 2 mm, and the pore size is as large as about 0.1 mm (100 $\mu$m). Further, the thickness of the ion exchange resin layer is considerably thick. With such a diaphragm, the membrane resistance is high (the cell voltage exceeds 3.6 V in each Example given), and such a diaphragm is not necessarily satisfactory.

Further, Japanese Unexamined Patent Publication No. 71888/1976 discloses a diaphragm obtained by laminating a stretched porous layer and an ion exchange layer having sulfonic acid groups. In this case, the ion exchange layer is thicker than the porous layer, and there is no disclosure as to which side as between the anode side and the cathode side in the electrolytic cell the ion exchange resin layer should be disposed.

It is an object of the present invention to provide a diaphragm for electrolysis, which is capable of attaining high current efficiency and which at the same time, has low electric resistance and particularly high mechanical strength, as compared with conventional diaphragms.

Another object of the present invention is to provide a diaphragm useful for the electrolysis of various aqueous solutions, particularly for the electrolysis of an aqueous alkali metal chloride solution for the production of an alkali metal hydroxide and chlorine, and a method for the electrolysis and an electrolytic cell, in which such a diaphragm is used.

The present invention provides a novel multi-layered diaphragm for electrolysis, which comprises a porous layer of a fluorine-containing polymer having a pore diameter of from 0.05 to 10 $\mu$m, a porosity of from 30 to 95% and a thickness of from 30 to 450 $\mu$m and with its interior and anode-side surface being hydrophilic, and an ion exchange resin layer supported on the cathode side thereof and having a thickness thinner than the porous layer but of at least 5 $\mu$m and an ion exchange capacity of from 0.5 to 2.0 meq/g dry resin, the total thickness being from 35 to 500 $\mu$m.

Now, the present invention will be described in detail with reference to the preferred embodiments.

The multi-layered diaphragm of the present invention is basically a combination of the porous layer specified above and the ion exchange resin layer specified above, and it is based on a novel concept and findings, which have not been known before.

Namely, the present invention is based on a concept that in the diaphragm of the present invention, the current efficiency obtained, depends solely on the ion exchange resin layer which faces the cathode, and the porous layer on the anode side serves exclusively for the support and reinforcement of the ion exchange resin layer. Thus, the diaphragm of the present invention is constituted by an ion exchange layer having high electric resistance on the cathode side with a minimum thickness required for the accomplishment of the adequate current efficiency, and a porous layer having low electric resistance and high mechanical strength. However, according to the researches conducted by the present inventors, it has been found impossible to attain the object by simply laminating the porous layer and the ion exchange layer.

Namely, conventional multi-layered diaphragms composed of a porous layer and an ion exchange resin layer, have extremely large pore sizes and thickness, for instance, as shown in the above-mentioned Japanese Unexamined Patent Publication No. 11199/1978, and the electric resistance is necessarily high, whereby it is impossible to obtain a low resistance diaphragm. It has now been found that in order to obtain a low resistance diaphragm, it is necessary to reduce the thickness of the porous layer as far as possible, and in order to bring about high mechanical strength in such a case, it is desirable to reduce the pore size to a level of from 0.05 to 10 $\mu$m, and it is preferred to use a stretched porous material.

On the other hand, according to the study by the present inventors, it has been found that when the pore size is reduced, the gas and air bubbles generated during the electrolysis are likely to deposit over the pores of the porous layer even when the porosity is made high, and the membrane resistance tends to be even greater than that of a conventional closed diaphragm such as a normal ion exchange membrane. According to the present invention, as a result of the study for the improvement on this point, it has been found that a remarkable improvement is obtainable by using a porous layer with its interior and anode-side surface being hydrophilic.

Accordingly, the porous layer of the present invention has a hydrophilic nature in its interior as well as the surface facing the anode. The reason why the anode side surface of the porous layer must have a hydrophilic nature, is not necessarily clearly understood. However, as is evident from the Examples given hereinafter, a low membrane resistance during the electrolysis can not be attained when a porous layer having no hydrophilic nature is employed.

Thus, the multi-layered diaphragm according to the present invention, provides high current efficiency and low membrane resistance for the electrolysis, and by the use of a porous layer, preferably a stretched porous layer, it provides particularly high mechanical strength, especially high tear strength required for the electrolytic diaphragm during the electrolysis or in its handling.

Now, the present invention will be described in further detail.

The porous layer on the anode side constituting the multi-layered diaphragm of the present invention, is made of a fluorine-containing polymer, and has the specified pore size, porosity and thickness, and the anode side surface and the interior must be hydrophilic.

The fluorine-containing polymer for the porous layer, includes preferably polytetrafluoroethylene or a copolymer of tetrafluoroethylene with $CF_2=CFC_nF_{2n+1}(n = 1$ to $5)$ or $$CF_2=CFO-(CF_2CFO)_mC_nF_{2n+1}$$
$$|$$
$$CF_3$$

(m=0 to 15, n=1 to 15).

The porous layer preferably has a pore size of from 0.05 to 10 μm and a porosity of from 30 to 95%, and the thickness is preferably from 30 to 450 μm to obtain a low membrane resistance and high mechanical strength. Particularly preferred are a pore size of from 0.1 to 8 μm, a porosity of from 50 to 90% and a thickness of 60 to 300 μm. Here, the porosity means a ratio of the volume occupied by pores to the entire volume of the porous material, and it is usually measured by a density method.

The above-mentioned porous material of a fluorine-containing polymer may be prepared by various methods, for instance, by a method wherein a fluorine-containing polymer is mixed with a pore-forming agent, and then formed into a membrane, followed by the extraction and removal of the pore-forming agent to obtain a porous material. However, the most preferred porous material in the present invention is a porous membrane obtained by forming a mixture of a fluorine-containing polymer, prefeably non-sintered polytetrafluoroethylene, with a liquid lubricant such as white kerosine oil, kerosine or fluorine oil, into a membrane by extrusion or rolling, followed by monoaxial or multi-axial stretching treatment. Such a porous material may be subjected to sintering treatment at a temperature lower or higher than the melting point of the tetrafluoroethylene in a fixed state not to permit heat shrinkage, if necessary. Such a stretched porous material of a fluorine-containing polymer is per se known, for instance, by Japanese Examined Patent Publication No. 19909/1979.

The porous layer of the fluorine-containing polymer is treated to impart a hydrophilic nature to the anode side surface and interior thereof, prior to or subsequent to the lamination with an ion exchange resin layer, as described hereinafter. Various methods may be employed as a means to impart the hydrophilic nature to the porous material. For instance, an inorganic hydrophilic nature-imparting agent is incorporated during the formation of the porous material to impart the hydrophilic nature to the material forming the porous layer.

As such an inorganic hydrophilic nature-imparting agent, there may be mentioned oxides, hydroxides, nitrides and carbides of e.g. titanium, zirconium, niobium, tantalum, vanadium, manganese, molybdenum and tin, as well as silicon carbide, barium titanate and barium sulfate. The hydrophilic nature will be imparted by incorporating particles of such a agent having an average particle size of at most 5 μm in an amount of from 5 to 100% by weight relative to the fluorine-containing polymer.

As another means to impart a hydrophilic nature to the surface and the interior of the fluorine-containing polymer, there may be mentioned a method wherein a hydrophilic monomer is impregnated into the porous material in an amount not to reduce the porosity excessively, followed by polymerization; a method wherein a hydrophilic polymer is filled or coated in a form of a solution, followed by drying and sintering; or a method wherein the fluorine-containing polymer itself is a polymer of a monomer having hydrophilic groups.

As the monomer and the polymer having a hydrophilic nature, there may be mentioned a fluorine-containing monomer or polymer having carboxylic acid groups, sulfonic acid groups and/or phosphoric acid groups, which may form an ion exchange resin layer as described hereinafter. Thus, such a monomer having a hydrophilic nature is impregnated into a porous material and polymerized, or a polymer of such a monomer is coated on a porous material in the form of a solution having a concentration of from 0.5 to 50% by weight (e.g. Japanese Examined Patent Publication No. 13333/1973 and Japanese Unexamined Patent Publication No. 149336/1980). Such a fluorine-containing polymer having a hydrophilic nature is deposited on the porous material preferably in an amount of from 1 to 300% by weight, especially from 2 to 100% by weight, relative to the porous material.

Thus, the anode side surface of the porous layer can be made hydrophilic by the deposition of the fluorine-containing polymer having a hydrophilic nature as mentioned above. However, it has been found by the present inventors that such a hydrophilic nature can be imparted efficiently by forming an inorganic hydrophilic particle layer on the surface of the porous layer. The particle layer may have an electrocatalytic activity, or may not have such an electrocatalytic activity. The particle layer may be a porous layer having a thickness of from 0.1 to 50 μm, preferably from 0.5 to 20 μm, or may be a sporadic particle layer. Such a particle layer and its formation are disclosed in U.S. patent application No. 205,567 or UK Patent Publication No. 2064586. The above-mentioned particle layer may be formed on a porous layer surface in the same manner as disclosed in these publications by substituting the above-mentioned fluorine-containing porous layer for the ion exchange membrane. As another method for imparting a hydrophilic nature to the surface of the porous layer, a hydrophilic substance may be added to the anolyte during the use, thereby to form a hydrophilic surface.

The cathode side ion exchange resin layer constituting the multi-layered diaphragm of the present invention is made of a fluorine-containing polymer having an ion exchange capacity of from 0.5 to 2.0 meq/g dry resin, preferably from 0.8 to 1.6 meq/g dry resin, and having preferably carboxylic acid groups, sulfonic acid groups or phosphoric acid groups.

Such a fluorine-containing polymer is preferably a copolymer of at least two type of monomers, and particularly preferred is a copolymer having the following repeating units (a) and (b):

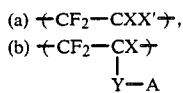

wherein each of X and X' is —F, —Cl, —H or —CF$_3$, A is —SO$_3$M or —COOM (where M is hydrogen, alkali metal or a group which can be converted to such groups by hydrolysis), and Y is selected from the following groups:

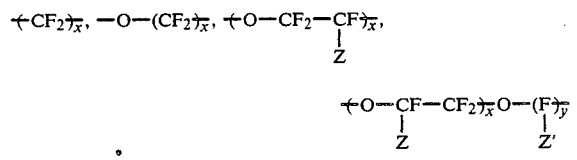

wherein each of Z and Z' is —F or a perfluoroalkyl group having from 1 to 10 carbon atoms, and each of x, y and z is an integer of 1 to 10.

The molar ratio of (a)/(b) constituting the above polymer is selected so that the fluorine-containing polymer will have the above-mentioned ion exchange capacity.

The above-mentioned fluorine-containing polymer is preferably a perfluoropolymer. Preferred examples include a copolymer of CF$_2$=CF$_2$ with CF$_2$=CFOCF$_2$CF(CF$_3$)OCF$_2$CF$_2$SO$_2$F, a copolymer of CF$_2$=CF$_2$ with CF$_2$=CFO(CF$_2$)$_{3-5}$SO$_2$F, a copolymer of CF$_2$=CF$_2$ with CF$_2$=CFO(CF$_2$)$_{1-5}$COOCH$_3$, and a copolymer of CF$_2$=CF$_2$ with CF$_2$=CFOCF$_2$CF(CF$_3$)OCF$_2$CF$_2$COOCH$_3$.

The ion exchange resin layer may also be made of a laminated layer or a blended layer comprising two or more fluorine-containing polymers having different ion exchange groups and/or different ion exchange capacities. Namely, by using a combination of at least two types such as a combination of a fluorine-containing polymer having carboxylic acid groups and a fluorine-containing polymer having sulfonic acid groups, or a combination of at least two fluorine-containing polymers of the same type with different ion exchange groups, the respective fluorine-containing polymers may be blended to form an ion exchange resin layer, or the respective fluorine-containing polymers may preliminarily be formed into films, and such films are preferably heated and pressed for lamination to form an ion exchange resin layer. Further, the ion exchange resin layer may also be formed by converting ion exchange groups such as sulfonic acid groups on one side or both sides of a fluorine-containing polymer film into carboxylic acid groups.

When an ion exchange resin layer is formed from two or more fluorine-containing polymers, the fluorine-containing polymer layer facing the cathode side is preferably made of a fluorine-containing polymer having carboxylic acid groups, which is capable of providing a small water content during the electrolysis, so that, according to the present invention a highly concentrated alkali metal hydroxide is produced at high current efficiency. However, in some cases, the cathode side layer may be made of a fluorine-containing polymer having sulfonic acid groups or phosphoric acid groups.

The thickness of the ion exchange resin layer is important in the present invention. Namely, an ion exchange membrane is a densed diaphragm with low water-permeability, and thus has a higher resistance as compared with a porous layer. Particularly, the ion exchange membrane layer on the cathode side of the present invention tends to have a higher resistance because the water content is reduced. Therefore, the thickness of the ion exchange resin layer is made preferably as small as possible, and usually smaller than the porous layer on the anode side. However, if the thickness is too small, the anolyte and the catholyte are likely to be mixed by diffusion through the ion exchange resin layer. Therefore, the thickness of the ion exchange resin layer is preferably at least 5 μm, more preferably at least 10 μm. In order to minimize the resistance, a small membrane thickness is selected as mentioned above, and the thickness is usually at most 100 μm, preferably at most 80 μm.

The above-mentioned ion exchange resin layer is preferably integrally laminated and supported on the cathode side of the porous layer. There is no particular restriction as to the manner for such lamination or support. However, it is preferred that an ion exchange membrane is overlaid on the cathode side surface of the porous layer, and heated and fused at a temperature of at least the softening temperature of the ion exchange membrane, preferably at least the melting point of the ion exchange membrane, e.g. from 100° to 250° C.

In addition to such a method, it is possible in the present invention to employ a method of forming a coating layer in which a solution, suspension or paste of the polymer for forming the ion exchange resin layer optionally with other resins or plasticizers, is coated on the cathode side of the porous layer, and the solvent is evaporated or the coating is heated to a temperature higher than the softening point of the polymer. In any case, in the present invention, any method may be employed so long as it provides a laminated layer in which an ion exchange resin layer is integrally laminated and supported on the cathode side of the porous layer, and the total thickness will be from 35 to 500 μm, preferably from 70 to 350 μm.

The multi-layered diaphragm comprising the porous layer and the ion exchange resin layer, thus obtained, is subjected to the above-mentioned treatment for imparting the hydrophilic nature at this stage, if the surface and the interior of the porous layer have not been made hydrophilic. After imparting the hydrophilic nature to the porous layer, the multi-layered diaphragm may be employed by itself. However, it is also possible to provide a gas and liquid permeable porous layer containing electrocatalytically inactive particles (U.S. patent application No. 205,567 or UK Patent Publication No. 2064586) or a gas and liquid permeable porous layer containing electrocatalytically active particles (U.S. Pat. No. 4,224,121) on the cathode side surface of the ion exchange resin layer of the present invention, to further reduce the membrane resistance during the electrolysis.

The electrolysis of an aqueous alkali metal chloride solution by means of the multi-layered diaphragm of the present invention may be conducted under known conditions as disclosed in U.S. Pat. Nos. 4,224,121 and 4,367,126. For instance, the electrolysis is conducted by supplying an aqueous alkali metal chloride solution of from 2.5 to 5.0 N into the anode compartment and water or dilute alkali metal hydroxide into the cathode compartment, preferably at a temperature of from 50° to 120° C. at a current density of from 10 to 100 A/dm$^2$. In such a case, it is preferred to minimize the presence of heavy metal ions such as calcium or magnesium in the aqueous alkali metal chloride solution, since such heavy metal ions bring about a deterioration of the ion exchange membrane. Further, in order to prevent as far as possible the generation of oxygen at the anode, an acid such as hydrochloric acid may be added to the aqueous alkali metal chloride solution.

In the present invention, the electrolytic cell may be a monopolar type or bipolar type, so long as the above construction is employed. With respect to the material constituting the electrolytic cell, for instance, in the case of the anode compartment for the electrolysis of an aqueous alkali metal chloride solution, a material resistant to an aqueous alkali metal chloride solution and chlorine, such as a valve metal like titanium, may be used, and in the case of the cathode compartment, iron, stainless steel or nickel resistant to an alkali metal hydroxide and hydrogen, may be used.

In the present invention, when an electrode is to be installed, it may be disposed in contact with the multi-layered diaphragm, or may be disposed with a space from the diaphragm. Particularly in the case of the present invention, a advantageous cell voltage resulting from the low membrane resistance, can be obtained without any trouble when the electrode is disposed in contact with the diaphragm.

In the foregoing, the use of the diaphragm of the present invention has been described primarily with respect to the electrolysis of an aqueous alkali metal chloride solution. However, it should be understood that the diaphragm of the present invention is likewise applicable to the electrolysis of water, a halogen acid (hydrochloric acid or hydrobromic acid) or an alkali metal carbonate.

Now, the present invention will be described in further detail with reference to Examples. However, it should be understood that the present invention is by no means restricted by these specific Examples.

EXAMPLE 1

A mixture of a fine powder of polytetrafluoroethylene (hereinafter referred to simply as "PTFE") and white kerosine oil as a liquid lubricant, was formed into a membrane. The white kerosine oil was removed, and the membrane was monoaxially stretched and subjected to heat treatment to obtain a PTFE porous material having a stabilized porous structure with a pore diameter of 1 μm and a porosity of 80% and having a thickness of 110 μm.

Then, by using water as the medium, $C_8F_{17}COONH_4$ as a surfactant and ammonium persulfate as an initiator, $C_2F_4$ and $CF_2=CFO(CF_2)_3COOCH_3$ were copolymerized to obtain a copolymer having an ion exchange capacity of 1.25 meq/g (copolymer A) and a copolymer having an ion exchange capacity of 1.44 meq/g (copolymer B). Copolymers A and B were respectively melt-extruded into films having a thickness of 40 μm and 20 μm, respectively.

Then, a laminate of the above PTFE porous material/copolymer B film/copolymer A film was heated and pressed to obtain a multi-layered diaphragm (1) having a thickness of 160 μm.

On the other hand, a mixture comprising methyl cellulose containing 30% by weight of silicon carbide having a particle size of 0.3 μm, water, cyclohexanol and cyclohexane, was kneaded to obtain a paste. The paste was coated on a Mylar film and dried to form a porous silicon carbide layer having a thickness of 10 μm and with the deposition of silicon carbide particles in an amount of 1 mg per cm$^2$ of the film surface.

The silicon carbide porous layer thus obtained, was laminated on the copolymer A film surface of the abovementioned multi-layered diaphragm (1) and heated and pressed to obtain a multi-layered diaphragm (2) having a thickness of 165 μm.

On the other hand, by using 1,1,1-trichlorotrifluoroethane as the medium and azobisisobutyronitrile as an initiator, $C_2F_4$ and

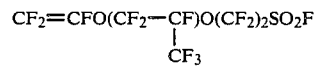

were copolymerized to obtain a copolymer having an ion exchange capacity of 1.1 meq/g (copolymer C). Copolymer C was converted to an acid type, and then ethanol was added to obtain a solution containing 2% by weight of copolymer C.

The solution of copolymer C was coated on the porous layer of the multi-layered diaphragm (2) held to be horizontal, and dried to obtain a multi-layered diaphragm (3) with its porous inner wall coated with copolymer C. The coating amount of copolymer C was 7% by weight of the weight of the porous layer.

Then, to the solution of copolymer C, 15% by weight of $ZrO_2$ having a particle size of 5 μm and a small amount of a surfactant were added to obtain a suspension, and the suspension was spray-coated on the porous layer side of the multi-layered diaphragm (3) to obtain a multi-layered diaphragm (4) having a $ZrO_2$ porous layer.

Such a multi-layered diaphragm (4) was hydrolyzed in an aqueous solution containing 25% by weight of sodium hydroxide. To the PTFE porous layer side with a $ZrO_2$ porous layer of the diaphragm thus obtained, an anode prepared by coating a solid solution of ruthenium oxide, iridium oxide and titanium oxide on a titanium punched metal (short opening diameter: 4 mm, long opening diameter: 8 mm) and having a low chlorine overvoltage, was pressed to be in contact with the diaphragm. Likewise, to the copolymer A film side with a silicon carbide porous layer of the diaphragm, a cathode prepared by subjecting a SUS 304 punched metal (short opening diameter: 4 mm, long opening diameter: 8 mm) to etching treatment in an aqueous solution containing 52% by weight of sodium hydroxide at 150° C. for 52 hours and having a low hydrogen overvoltage, was pressed to be in contact with the diaphragm. Then, electrolysis was conducted at 90° C. at a current density of 30 A/dm$^2$, while supplying a 5N sodium chloride aqueous solution to the anode compartment and water to the cathode compartment, and maintaining the sodium chloride concentration in the anode compartment at the predetermined level as identified in Table 1 and the sodium hydroxide concentration in the cathode compartment at a level of 35% by weight.

As a Comparative Example, the multi-layered diaphragm (3) having no $ZrO_2$ porous layer on the PTFE porous layer, was hydrolyzed and used for the electrolysis in the same manner as above. The results are shown in Table 1.

TABLE 1

|  | Sodium chloride concentration in anode compartment | Current efficiency (%) | Cell voltage (V) |
|---|---|---|---|
| Example 1 | 240 g/liter | 95.6 | 2.82 |
|  | 200 g/liter | 95.5 | 2.82 |
|  | 160 g/liter | 95.4 | 2.83 |
| Comparative Example 1 | 200 g/liter | 95.5 | 3.01 |

Thirty days after the electrolysis, the electrolytic cell was disassembled, whereby deposition of NaCl crystals over about 20% of the surface area of the anode side PTFE porous layer surface of Comparative Example 1 was observed. On the other hand, no change was observed on the anode side of Example 1, thus indicating the effectiveness of the presence of hydrophilic inorganic fine particles on the porous surface.

EXAMPLE 2

A mixture of a fine powder of polytetrafluoroethylene and a liquid lubricant (white kerosine oil) was formed into a membrane. Then, the lubricant was removed, and the membrane was biaxially stretched and subjected to heat treatment to obtain a PTFE porous material having a stabilized porous structure with a pore diameter of 0.5 $\mu$m and a porosity of 70% and having a thickness of 120 $\mu$m.

In the same manner as in Example 1 except for using the above PTFE porous material, a multi-layered diaphragm (1) having a thickness of 170 $\mu$m was obtained from a laminate of 120 $\mu$m of PTFE porous material/20 $\mu$m of copolymer B/40 $\mu$m of copolymer A, and then a silicon carbide porous layer having a thickness of 10 $\mu$m was heated and press-bonded to the surface of copolymer A to obtain a multi-layered diaphragm (2).

On the other hand, a solution of zirconyl chloride in a mixture of water and isopropanol was added to the ethanol solution of acid type copolymer C obtained in Example 1, to obtain an ethanol-water-isopropanol solution containing 2% by weight of copolymer C and 20% by weight of zirconyl chloride.

The multi-layered diaphragm (2) was immersed in the solution thus obtained, to impregnate the solution into the porous material of the multi-layered diaphragm, and then dried to obtain a multi-layered diaphragm (3) with the porous inner wall coated with a mixture of zirconyl chloride and copolymer C. The coating amount was 70% by weight of the weight of porous layer. Then, an ethanol-water mixed solution containing 3% by weight of copolymer C and 15% by weight of $ZrO_2$ having a particle size of 5 $\mu$m, was spray-coated on the porous layer side of the multi-layered diaphragm (3) in the same manner as in Example 1, to obtain a multi-layered diaphragm (4) with a coating of fine $ZrO_2$ particles.

The multi-layered diaphragm (4) was hydrolyzed in the same manner as in Example 1. A part thereof was used for the measurement of the mechanical strength, and the rest of the diaphragm was used for the electrolysis in the same manner as in Example 1, whereby the electrolysis was conducted at 90° C. at a current density of 30 A/dm$^2$, while maintaining the sodium chloride concentration in the anode compartment to a level of 200 g/liter and the sodium hydroxide concentration in the cathode compartment to a level of 35% by weight.

As a Comparative Example, a multi-layered diaphragm was prepared in which a compolymer B film having a thickness of 120 $\mu$m or a copolymer C film having a thickness of 120 $\mu$m was used at the anode side instead of the porous material, and subjected to the measurement of the strength and the electrolysis in the same manner as above. The results are shown in Table 2.

TABLE 2

|  | Diaphragm | Tensile breaking strength (kg/cm width) | Tear strength (g) | Current efficiency (%) | Cell voltage (V) |
|---|---|---|---|---|---|
| Example 2 | Multi-layered diaphragm (4) | 6.0 | 700 | 95.5 | 2.83 |
| Comparative Example 2-1 | Multi-layered diaphragm A | 6.0 | 40 | 95.5 | 2.96 |
| Comparative Example 2-2 | Multi-layered diaphragm B | 5.2 | 30 | 95.3 | 2.93 |

EXAMPLE 3

A PTFE porous material having a stabilized porous structure with a pore diameter of 3 $\mu$m and a porosity of 80% and a thickness of 200 $\mu$m, was obtained by biaxially stretching in the same manner as in Example 2. Except for using the above PTFE porous material, a multi-layered diaphragm (1) having a thickness of 250 $\mu$m was obtained from a laminate of 200 $\mu$m of PTFE porous material/20 $\mu$m of copolymer B/40 $\mu$m of copolymer A, in the same manner as in Example 1, and then a silicon carbide porous layer was heated and press-bonded to the surface of the copolymer A to obtain a multi-layered diaphragm (2).

On the other hand, by using water as the medium, $C_8F_{17}COONH_4$ as a surfactant and ammonium persulfate as an initiator, $C_2F_4$ and $CF=CFO(CF_2)_3COOCH_3$ were copolymerized to obtain a copolymer having an ion exchange capacity of 1.80 meq/g (copolymer D). Copolymer D was hydrolyzed to an acid type, and then acetone was added to obtain a 15 wt. % solution, a 5 wt. % solution and a 2 wt. % solution, respectively.

To the three types of solutions thus obtained, multi-layered diaphragms (2) were immersed, respectively, to impregnate the respective solutions to the porous layers of the multi-layered diaphragms, and then dried to form coatings of copolymer D on the porous inner walls, whereby three types of multi-layered diaphragms 3-1, 3-2 and 3-3 having different coating amounts were obtained.

The three types of multi-layered diaphragms (3) were hydrolyzed in an aqueous solution containing 2.5% by weight of sodium hydroxide, and then immersed in a 2N NaCl solution of pH of 1 containing 20 g/liter of $ZrO(NO_3)_2$. Then, an alkali was added to adjust the pH to 7, whereby fine particles of zirconyl hydroxide were precipitated and deposited on the porous material, to obtain multi-layered diaphragms 4-1, 4-2 and 4-3. The three types of multi-layered diaphragms (4) were subjected to the measurement of the mechanical strength and to the electrolysis under the same condition as in Example 2.

As Comparative Examples, multi-layered diaphragms C and D were prepared wherein a porous layer completely filled with copolymer D (porosity: 0) and a copolymer D film layer having a thickness of 200 μm were used, respectively, at the anode side, and subjected to the measurement of the mechanical strength and the electrolysis in the same manner. The results are shown in Table 3.

diaphragms were used for the electrolysis in the same manner as in Example 2 with the respective porous layers located at the anode side. At the initiation of the electrolysis, a 5N sodium chloride aqueous solution containing 10 ppm of zirconium was supplied for 5 hours, whereby a layer of fine particles of zirconium hydroxide was precipitated and deposited on the PTFE porous layer surfaces of the multi-layered diaphragms.

As a Comparative Example, the results obtained by the electrolysis in which no zirconia was supplied at the initiation of the electrolysis, are shown in Table 4.

TABLE 3

|  | Diaphragm | Ratio of coated copolymer D to porous material (%) | Tensile breaking strength (kg/cm width) | Tear strength (g) | Current efficiency (%) | Cell voltage (V) |
|---|---|---|---|---|---|---|
| Example 3-1 | Multi-layered diaphragm 4-1 | 7 | 6.2 | 400 | 95.5 | 2.83 |
| Example 3-2 | Multi-layered diaphragm 4-2 | 20 | 6.3 | 380 | 95.5 | 2.84 |
| Example 3-3 | Multi-layered diaphragm 4-3 | 90 | 6.8 | 300 | 95.5 | 2.87 |
| Comparative Example 3-1 | Multi-layered diaphragm (C) | 400 | 7.0 | 100 | 95.5 | 3.10 |
| Comparative Example 3-2 | Multi-layered diaphragm (D) | — | 6.3 | 45 | 95.5 | 2.99 |

EXAMPLE 4

A mixture of a fine powder of polytetrafluoroethylene and a liquid lubricant (white kerosine oil), was formed into a membrane. Then, the lubricant was removed, and the membrane was biaxially stretched, and then subjected to heat treatment to obtain three types of PTFE porous materials A, B and C having different membrane thicknesses and having stabilized porous structures, respectively.

(A) Pore diameter: 0.1 μm, porosity: 40%, thickness: 60 μm (B) Pore diameter: 0.1 μm, porosity: 40%, thickness: 120 μm (C) Pore diameter: 0.1 μm, porosity: 40%, thickness: 240 μm On the other hand, a multi-layered diaphragm was prepared by heating and pressing a laminate of 20 μm of copolymer B/40 μm of copolymer A/SiC porous layer in the same manner as in Example 1 except for the omission of the PTFE porous material.

Then, each of the above three types of PTFE porous materials was placed on a sintered perforated plate attached on one surface of a container with its interior capable of being vacuumed, and the above multi-layered diaphragm was placed thereon with the copolymer B side facing the PTFE porous material.

Then, while heating the multi-layered diaphragm, the container was vacuumed by means of a vacuum pump to laminate the multi-layered diaphragm and each of the porous materials by atmospheric pressure to obtain three types of multi-layered diaphragms of porous material/copolymer B/copolymer A/silicon carbide porous layer, in which porous materials A, B and C were used.

Then, an acetone solution containing 2% by weight of acid type copolymer D as used in Example 3, was coated on the porous layers of the three types of the multi-layered diaphragms held to be horizontal, and dried to obtain multi-layered diaphragms 4-1, 4-2 and 4-3 with the porous inner walls coated with copolymer D.

The three types of the multi-layered diaphragms were hydrolyzed in an aqueous solution containing 25% by weight of sodium hydroxide.

A part of each of the three types of the multi-layered diaphragms was subjected to the test for the mechanical strength, and the rest of the respective multi-layered

TABLE 4

|  | Diaphragm | Tensile breaking strength (kg/cm width) | Tear strength (g) | Current efficiency (%) | Cell voltage (V) |
|---|---|---|---|---|---|
| Example 4-1 | Multi-layered diaphragm 4-1 | 6.0 | 300 | 95.5 | 2.83 |
| Example 4-2 | Multi-layered diaphragm 4-2 | 7.0 | 600 | 94.5 | 2.90 |
| Example 4-3 | Multi-layered diaphragm 4-3 | 8.0 | 800 | 90.0 | 2.93 |
| Comparative Example 4-1 | Multi-layered diaphragm 4-1 | 6.0 | 300 | 95.3 | 3.03 |

EXAMPLE 5

By using a fine powder of polytetrafluoroethylene, a PTFE porous material having a pore diameter of 5 μm, a porosity of 80% and a membrane thickness of 110 μm, was obtained in the same manner as in Example 1.

Then, the PTFE porous material was immersed in an acetone solution containing 2% by weight of acid type copolymer D obtained in Example 3, and then dried to obtain a porous material with the porous inner wall coated with copolymer D. The coating amount of copolymer D was 8% of the weight of the porous material.

Then, copolymer A having an ion exchange capacity of 1.25 meq/g obtained in Example 1 was formed into membranes having a thickness of 80 μm, 40 μm and 20 μm, respectively, by melt extrusion molding.

Likewise, a membrane of copolymer D having an ion exchange capacity of 1.8 meq/g and having a thickness of 15 μm, and membranes of copolymer C having an ion exchange capacity of 1.1 meq/g and having a thickness of 5 μm and 40 μm, were prepared by extrusion molding.

On the other hand, in the same manner as in Example 1, a porous layer of silicon carbide was formed, and a ZrO$_2$ porous layer was formed, in the same manner as in the case of such porous layer, by kneading a mixture of methyl cellulose containing 30% by weight of ZrO$_2$ having a particle size of 5 μm, water, cyclohexanol and cyclohexane, to obtain a paste, and coating the paste on a Mylar film, followed by drying to obtain a ZrO$_2$ porous layer having a thickness of 10 μm and with ZrO$_2$ particles coated in an amount of 1 mg per cm$^2$ of the film surface.

A laminate of ZrO$_2$ porous layer/5 μm of copolymer C/porous material coated with copolymer D/various copolymer membrane (see Table 5)/SiC porous layer (see Table 5) was heated and compressed for lamination to obtain six types of multi-layered diaphragms as identified in Table 5.

The multi-layered diaphragm comprising 40 μm of copolymer C was hydrolyzed in an aqueous solution containing 20% by weight of potassium hydroxide, and the other five types of the multi-layered diaphragms were hydrolyzed in an aqueous solution cotnaining 25% by weight of sodium hydroxide.

The diaphragms thus obtained were subjected to the electrolysis in the same manner as in Example 2. The results are shown in Table 5.

TABLE 5

| | Types of membranes (Types of copolymers and presence or absence of SiC porous layer) | Current efficiency (%) | Cell voltage (V) |
|---|---|---|---|
| Example 5-1 | 80 μm Copolymer A membrane/ SiC layer | 95.5 | 2.90 |
| Example 5-2 | 40 μm Copolymer A membrane/ SiC layer | 95.5 | 2.82 |
| Example 5-3 | 20 μm Copolymer A membrane/ SiC layer | 95.4 | 2.79 |
| Example 5-4 | 15 μm Copolymer D membrane/ 20 μm Copolymer A membrane/ SiC layer | 95.3 | 2.78 |
| Example 5-5 | 15 μm Copolymer D membrane/ 20 μm Copolymer A membrane/ no SiC layer | 96.3 | 2.83 |
| Example 5-6 | 40 μm Copolymer C membrane/ no SiC layer | 88.0 | 2.85 |

EXAMPLE 6

By using R 113 as the medium and azobisisobutyronitrile as an initiator, C$_2$F$_4$ and

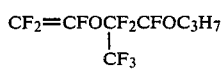

were copolymerized to obtain a copolymer containing 15 mol % of the latter (copolymer E). Then, by using water as the medium, C$_8$F$_{17}$COONH$_4$ as a surfactant and ammonium persulfate as an initator, C$_2$F$_4$ and CF$_2$=CFO(CF$_2$)$_3$COOCH$_3$ were copolymerized to obtain a latex of copolymer having an ion exchange capacity of 1.25 meq/g (copolymer F).

Then, copolymer E, silica gel (particle size: 10 μm) and fluorine oil (Halocarbon 1200) were weighed in the same amount by weight and adequately kneaded by heating rolls and then formed by pressing into a membrane having a thickness of 150 μm.

Then, the membrane was treated under reflux of trichlene for 40 hours, and then treated in a 25% NaOH methanol aqueous solution (water:methanol:NaOH=50:25:25) at 90° C. for 40 hours. Then, the membrane was thoroughly washed and dried, and then biaxially stretched to obtain a porous membrane having a thickness of 120 μm and a porosity of 60%.

On the other hand, a copolymer F latex was passed through an ion exchange resin column to remove the surfactant and the initiator, and then N-methylpyrrolidone was added. Water in the latex was removed by a rotary evaporator to obtain an organic dispersion having a polymer concentration of 25% and a viscosity of 1000 cp with a medium of N-methylpyrrolidone. The organic dispersion thus obtained was coated on one side of the above porous membrane and dried to obtain a multi-layered diaphragm (1) composed of a porous membrane/30 μm of a cast membrane of copolymer F.

Then, a water-ethanol-isopropanol mixed solution containing 2% by weight of copolymer C and 5% by weight of ZrOCl$_2$ was prepared by using an ethanol solution of acid type polymer of copolymer C, ZrO$_2$ having a particle size of 5 μm and ZrOCl$_2$.

The mixed solution was spray-coated on both sides of the multi-layered diaphragm (1) and dried to obtain a multi-layered diaphragm having a thickness of 160 μm and composed of ZrO$_2$ fine particle layer/ZrOCl$_2$-coated copolymer C porous layer/copolymer F membrane/ZrO$_2$-ZrOCl$_2$ layer. The diaphragm was hydrolyzed in a 25 wt. % sodium hydroxide solution and subjected to the same electrolysis as in Example 2, whereby the current efficiency was 95.4% and the cell voltage was 2.85 V.

The tear strength of the diaphragm was 150 g, which is stronger by from 4 to 5 times than the tear strength of Comparative Examples in Example 2.

We claim:

1. A multi-layered diaphragm for electrolysis, which comprises a porous layer of a fluorine-containing polymer having a pore diameter of from 0.05 to 10 μm, a porosity of from 30 to 95% and a thickness of from 30 to 450 μm and with its interior and anode-side surface being hydrophilic, and an ion exchange resin layer supported on the cathode side thereof and having a thickness thinner than the porous layer but of at least 5 μm and an ion exchange capacity of from 0.5 to 2.0 meq/g dry resin, the total thickness being from 35 to 500 μm.

2. The diaphragm according to claim 1, wherein the porous layer with its surface and interior being hydrophilic is a porous layer with its interior coated with a hydrophilic resin and with its surface formed with a hydrophilic particle layer.

3. The diaphragm according to claim 1, wherein the porous layer with its surface and interior being hydrophilic is made of a fluorine-containing polymer containing a hydrophilic nature-imparting agent.

4. The diaphragm according to claim 1, wherein the ion exchange resin layer is made of at least two types of fluorine-containing polymers having sulfonic acid groups and/or carboxylic acid groups, the fluorine-containing layer located closest to the cathode being a fluorine-polymer layer having carboxylic acid groups having the smallest water content.

5. An electrolytic cell which comprises anode and cathode compartments partitioned by a multi-layered diaphragm as defined in claim 1.

6. The electrolytic cell according to claim 5, wherein the multi-layered diaphragm is disposed so that the porous layer faces the anode and the ion exchange layer faces the cathode.

7. The electrolytic cell according to claim 5, wherein at least one of the anode and the cathode are in contact with the multi-layered diaphragm.

8. The electrolytic cell according to claim 5, wherein an aqueous alkali metal chloride solution is electrolysed to obtain an alkali metal hydroxide and chlorine.

9. An electrolytic process which comprises electrolyzing an aqueous alkali metal chloride solution in the electrolytic cell as defined in claim 5, at a temperature of from 80° to 120° C. and at a current density of from 10 to 100 A/dm$^2$ while supplying a 2.5–5.0N alkali metal chloride aqueous solution to the anode compartment and water or a dilute alkali metal hydroxide aqueous solution to the cathode compartment.

* * * * *